United States Patent
Pan et al.

(10) Patent No.: US 9,525,341 B2
(45) Date of Patent: Dec. 20, 2016

(54) LADDER-BASED HIGH SPEED SWITCH REGULATOR

(71) Applicant: Micron Technology, Inc., Boise, ID (US)

(72) Inventors: Feng Pan, Fremont, CA (US); Ramin Ghodsi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 4 days.

(21) Appl. No.: 14/581,710

(22) Filed: Dec. 23, 2014

(65) Prior Publication Data

US 2016/0181915 A1    Jun. 23, 2016

(51) Int. Cl.
*H02M 3/156* (2006.01)
*G05F 1/59* (2006.01)

(52) U.S. Cl.
CPC ............... *H02M 3/156* (2013.01); *G05F 1/59* (2013.01)

(58) Field of Classification Search
CPC ........ H02M 3/10; H02M 3/135; H02M 3/155; H02M 3/156; H02M 3/157; H02M 3/158; H02M 2001/0012; H02M 2001/0045; G05F 1/59
USPC ................. 323/265, 268, 271, 282–285, 351
See application file for complete search history.

(56) References Cited

U.S. PATENT DOCUMENTS

| | | | | |
|---|---|---|---|---|
| 5,966,004 A | * | 10/1999 | Kadanka | G05F 1/618 323/224 |
| 2008/0116862 A1 | * | 5/2008 | Yang | G05F 1/575 323/269 |
| 2009/0212753 A1 | * | 8/2009 | Lou | G05F 1/563 323/277 |
| 2009/0322295 A1 | * | 12/2009 | Scoones | G05F 1/56 323/282 |
| 2011/0181259 A1 | * | 7/2011 | Shen | G05F 1/575 323/282 |
| 2014/0002041 A1 | * | 1/2014 | Soenen | G05F 1/575 323/281 |
| 2014/0277812 A1 | * | 9/2014 | Shih | G05F 1/563 700/298 |

\* cited by examiner

*Primary Examiner* — Adolf Berhane
(74) *Attorney, Agent, or Firm* — Schwegman Lundberg & Woessner, P.A.

(57) ABSTRACT

Some embodiments include apparatuses having a switch regulator that includes a first circuit with a first comparator to compare an output of the switch regulator to a first reference voltage, and to provide a control signal to enable or disable a first pass element based on the comparison. The switch regulator includes at least a second circuit having a second comparator to compare an output of the switch regulator to a second reference voltage that is lower than the first reference voltage, and to provide a control signal to enable or disable a second pass element based on the comparison. The switch regulator does not include Miller compensation circuits. Other apparatuses and methods according to other embodiments are described.

19 Claims, 7 Drawing Sheets

LADDER-BASED HIGH SPEED SWITCH REGULATOR

BACKGROUND

Voltage regulators are used to provide a stable power supply voltage independent of load impedance, input-voltage variations, temperature, and time. Ongoing efforts are directed to balancing stability and speed in voltage regulators, while still meeting consumer demand for highly portable, low-power devices.

DETAILED DESCRIPTION

Power management is increasingly important for modern, highly-portable devices. One aspect of power management is the need to maintain stable operational voltages. Voltage regulators are often employed to maintain the necessary stability in operational voltage.

Figure 1:
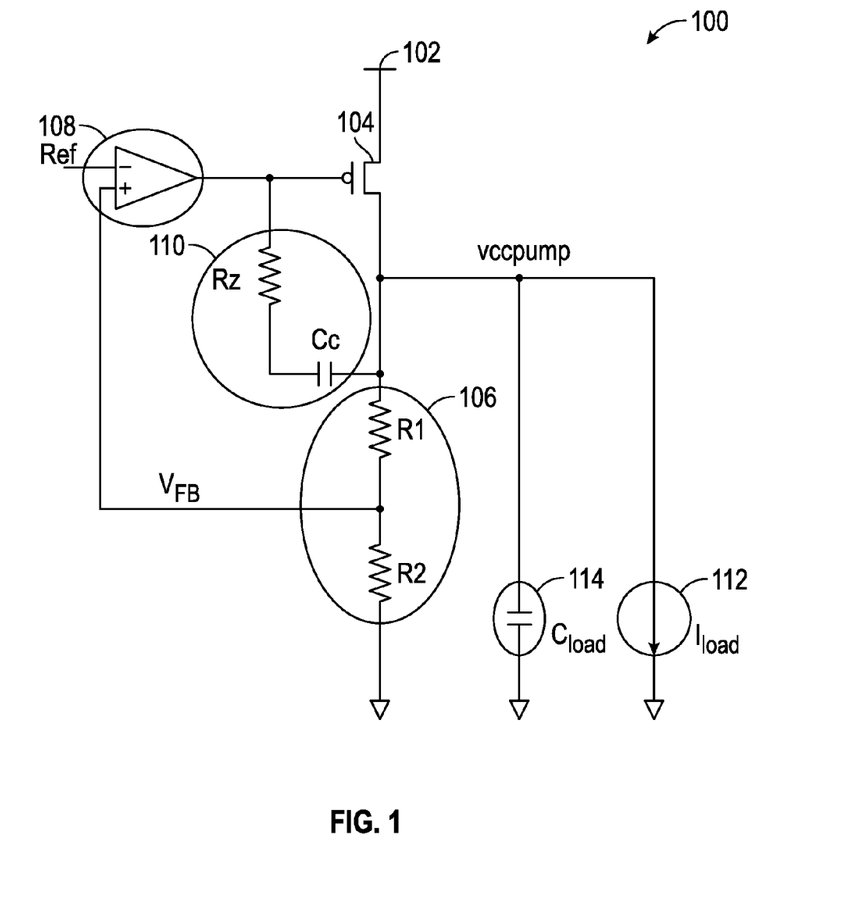
FIG. 1 shows a partial schematic diagram of a low-dropout (LDO) regulator as can be used in some available systems.

One such voltage regulator currently in use is the low-dropout (LDO) voltage regulator. FIG. 1 is a partial schematic diagram of one type of LDO 100 as can be used in some available systems. The input voltage 102 is applied to a pass element 104. The pass element 104 will typically include a p-channel complementary metal-oxide-semiconductor (PMOS). The pass element 104 operates in either the saturation region or the linear region to drop the input voltage down to the desired output voltage. The resulting sampled feedback voltage $V_{FB}$ passes through a feedback network 106 and is sensed by the error amplifier 108 and compared to a reference voltage Ref. The error amplifier 108 drives the pass element 104 gate to the appropriate operating point to ensure that the output is at the correct voltage. As the operating current or input voltage changes, the error amplifier 108 modulates the pass element 104 to maintain a constant output voltage. Under steady state operating conditions, an LDO 100 behaves as a resistor.

The LDO 100 includes a compensation circuit 110 for improved stability. The compensation circuit 110 can also be referred to as a Miller compensation circuit. While the compensation circuit 110 provides stability, the LDO 100 will have a smaller bandwidth (e.g., a slower response time) than the LDO 100 would have had without the compensation circuit 110. To help increase the bandwidth and provide a faster response to a switching load that may switch at high speeds, the error amplifier 108 may require a relatively large biasing current. The LDO 100 may require a large decoupling capacitance 114 to supply load current 112 in the time lapse that occurs before the error amplifier 108 is able to respond to provide load current 112 and recharge the decoupling capacitance 114. This decoupling capacitance 114 can further slow response times, as well as increasing chip layout area or board design cost.

To address these and other concerns, embodiments provide a ladder-based switch regulator that uses a group of high speed comparators and pass elements to pass an external power supply into internal regulated voltage. The ladder-based switch regulator according to embodiments will not include a compensation circuit as described earlier herein. Accordingly, the ladder-based switch regulator of various embodiments will provide faster response times than other regulators that employ compensation circuits. The ladder-based switch regulator of various embodiments can be used with a master LDO such as that described above with reference to FIG. 1, although embodiments are not limited thereto and the ladder-based switch regulator of some embodiments can be used alone to provide voltage regulation.

Figure 2:
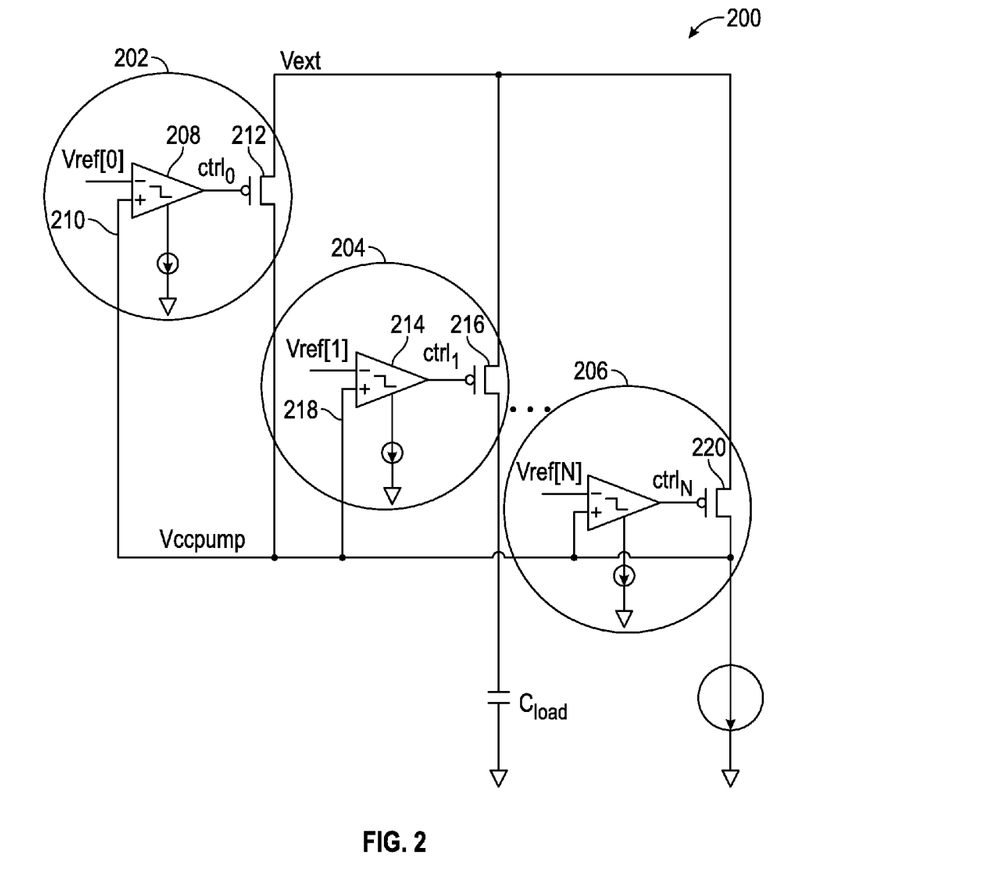
FIG. 2 shows a partial schematic diagram of a ladder-based high speed switch regulator in accordance with a first embodiment.

FIG. 2 is a partial schematic diagram of a ladder-based high speed switch regulator 200 in accordance with a first embodiment. The ladder-based high speed switch regulator 200 includes a number of stages (e.g., "circuits") 202, 204, and 206. While three circuits 202, 204, and 206 are shown in FIG. 2, embodiments are not limited thereto and the ladder-based high speed switch regulator 200 can include any number of circuits similar to circuits 202, 204 and 206. Each circuit 202, 204 and 206 includes a comparator and a pass element, described in more detail later herein, to introduces additional current drivability if the detected output level of the switch regulator 200 drops below a reference voltage Vref[0], Vref[1], Vref[N] corresponding to each circuit 202, 204, or 206 respectively. This additional current drivability can increase the output load current linearly, logarithmically, or according to any other function. If the detected output level of the switch regulator 200 rises above a respective reference voltage Vref[0], Vref[1], Vref[N], the comparator of the circuit 202, 204, or 206 corresponding to that reference voltage will turn off the corresponding pass element.

A circuit 202 includes a comparator 208. The comparator 208 includes a reference input for receiving a reference voltage Vref [0], a feedback input 210 coupled to an output Vccpump of the switch regulator 200, and a comparator output $ctrl_0$. The circuit 202 further includes a pass element 212, wherein the pass element 212 includes a control connection connected to the comparator output $ctrl_0$ and a connection to the output Vccpump of the switch regulator 200.

The circuit 204 includes a comparator 214 with a reference input for receiving a reference voltage Vref [1] lower than the reference voltage Vref [0]. The comparator 214 further includes a feedback input 218 coupled to the output Vccpump of the switch regulator 200, and a comparator output $ctrl_1$. The circuit 204 further includes a pass element 216 with a control connection connected to the comparator output $ctrl_1$ and a connection to the output Vccpump of the switch regulator 200.

As described earlier herein, any number of circuits similar to the circuits 202 and 204 can be included in the switch regulator 200. Further, the comparators 208, 214 are not limited to any particular implementation or inputs. For example, an alternative implementation would be to keep the reference voltage identical for all comparators, and choose a different feedback ratio (either resistive or capacitive) from Vccpump to feed into each of the different comparators 208, 214, etc.

The pass element 212 can have the same drive strength, higher drive strength, or lower drive strength than the pass element 216. Furthermore, each pass element in the switch regulator 200 can have different drive strength. The pass element 212, and any other pass element in the switch regulator 200, can include a PMOS transistor, although embodiments are not limited thereto. In other embodiments, the pass element 212, or any other pass element, can include n-channel metal-oxide-semiconductor (NMOS) transistor. Any of the comparators 208, 214, etc., can include a differential comparator, although embodiments are not limited thereto. The inputs to the comparators 208, 214, etc., are based upon a feedback ratio (either resistive or capacitive) of regulated voltage. Because the switch regulator 200 does not include or require compensation, the bandwidth of operation of the switch regulator 200 in accordance with embodiments can be increased relative to some available voltage regulators.

Figure 3:
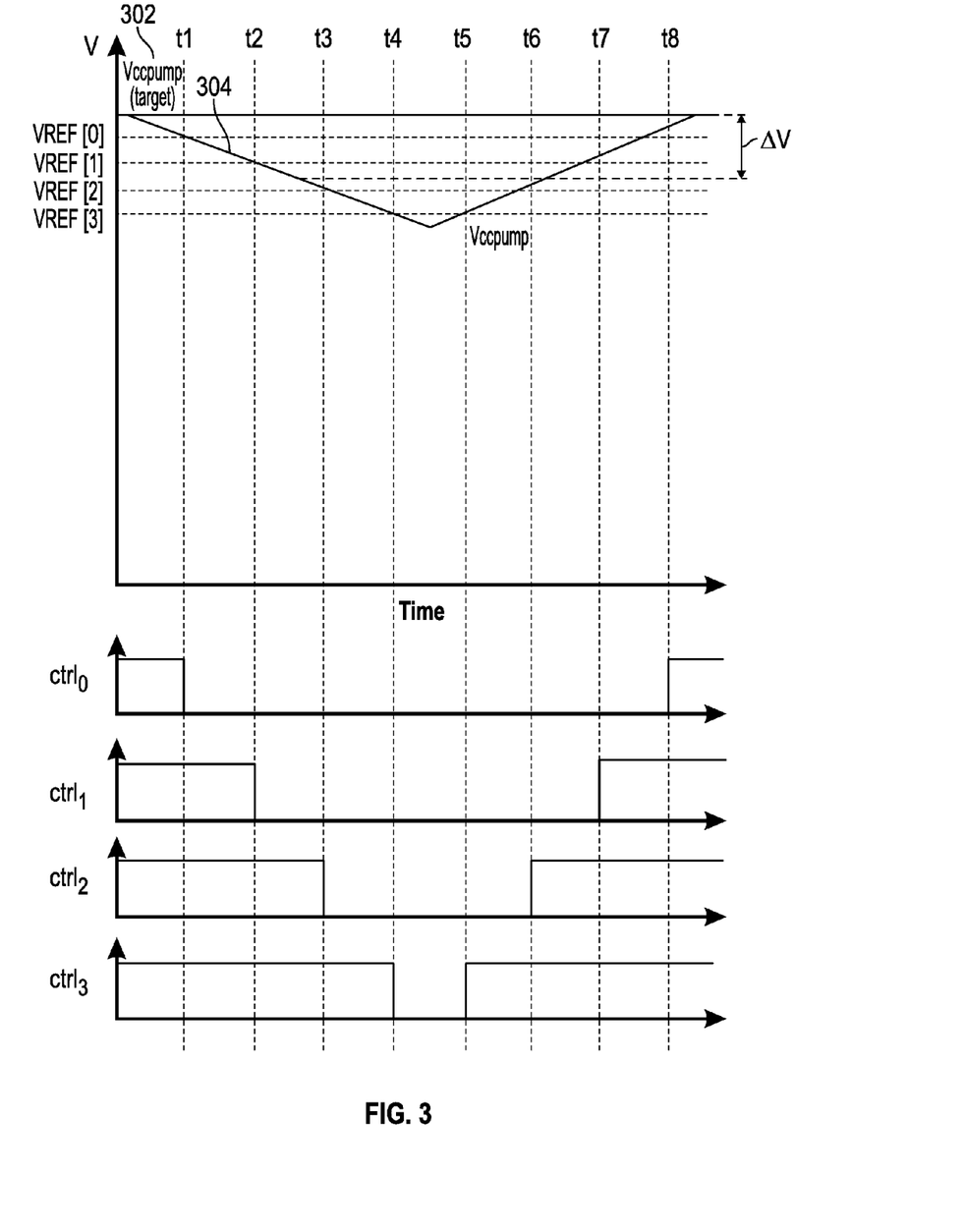
FIG. 3 shows a diagram illustrating control signals as a function of switch regulator output during operation of a switch regulator of FIG. 2 in accordance with some embodiments.

FIG. 3 illustrates control signals as a function of switch regulator output during operation of a switch regulator 200 (FIG. 2) in accordance with some embodiments. While four control signals $ctrl_0$, $ctrl_1$, $ctrl_2$, $ctrl_3$ are shown and described, any number of control signals may be possible depending on the number of circuits (e.g., stages) in the ladder-based switch regulator 200. The switch regulator 200 will turn on (e.g., "enable") one or more of pass elements 212, 216, 220 to provide drivability to maintain a target 302 output Vccpump.

When the output Vccpump of the switch regulator 200 falls below the reference voltage Vref [0] at time t1, the comparator output $ctrl_0$ is active low to enable the pass element 212. When the output Vccpump of the switch regulator 200 falls below the reference voltage Vref [1] at t2, the comparator output $ctrl_0$ and the comparator output $ctrl_1$ are both active low to enable the pass element 212 and the pass element 216. Similarly, when the output Vccpump of the switch regulator 200 falls below the reference voltage Vref [2] at t3, the comparator output $ctrl_0$, the comparator output $ctrl_1$, and the comparator output $ctrl_2$ are all active low to enable the pass element 212, the pass element 216, and the pass element associated with $ctrl_2$ (not shown in FIG. 2). Conversely, as the output Vccpump of the switch regulator 200 rises above various reference voltages in time intervals t5, t6, t7, and t8, corresponding pass elements are turned off (e.g., "disabled") when corresponding comparator outputs become high.

It will be appreciated upon examination of FIG. 2-3 that any number of reference voltages, comparators, and pass elements can be included in the switch regulator 200 to control the output of the switch regulator to maintain the switch regulator 200 output at the target 302. In some embodiments, the switch regulator 200 may maintain the output within a range, such as a 10% range, 5% range, etc., of the target 302. Furthermore, the pass elements 212, 216 and other pass elements (not shown in FIG. 2) can have different drive strengths. Accordingly, the switch regulator 200 can establish any kind of relationship, for example a linear, logarithmic, exponential, any-order polynomial, etc., relationship, between output load current and output voltage drop ΔV in the output Vccpump of the switch regulator 200.

Figure 4:
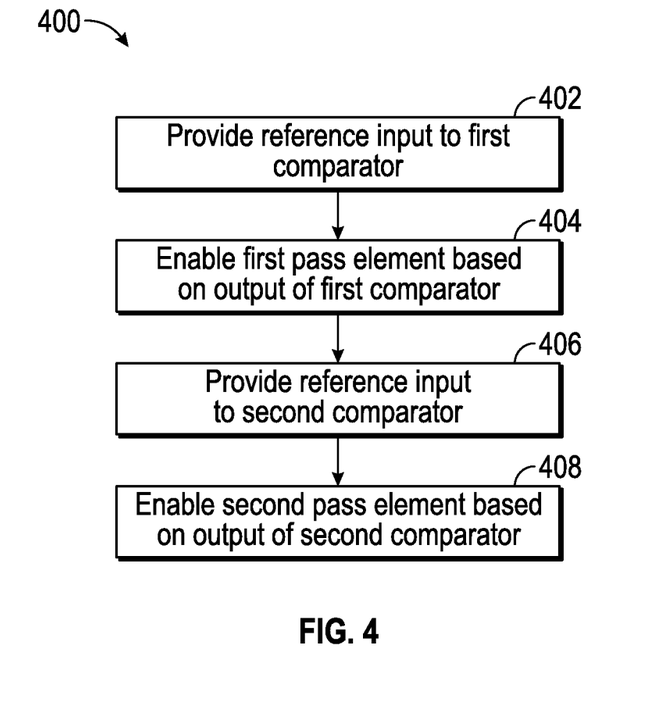
FIG. 4 is a flow diagram showing a method according to some embodiments.

FIG. 4 is a flow diagram showing an example method 400 of operating a ladder-based high speed switch regulator 200 of FIG. 2 in accordance with some embodiments.

The example method 400 begins at operation 402 with providing a reference voltage Vref [0] and output Vccpump of the switch regulator 200 to a comparator 208 of the switch regulator 200 to generate a comparator output $ctrl_0$.

The example method 400 continues at operation 404 with enabling a pass element 212 of the switch regulator 200 if the comparator output $ctrl_0$ indicates that the output Vccpump of the switch regulator 200 is less than the reference voltage reference voltage Vref [0].

The example method 400 continues at operation 406 with providing a reference voltage Vref [1], lower than the reference voltage Vref [0], to a comparator 214 of the switch regulator 200 to generate a comparator output $ctrl_1$.

The example method 400 continues at operation 408 with enabling a pass element 216 of the switch regulator 200, and maintaining enablement of the pass element 212, if the comparator output $ctrl_1$ indicates that the output Vccpump of the switch regulator 200 is less than the reference voltage Vref [1], and maintaining the pass element 216 of the switch regulator 200 in a disabled stated otherwise.

If the output Vccpump of the switch regulator 200 increases, corresponding pass elements may be disabled (e.g., "turned off"). For example, the example method 400 can further include disabling the pass element 216 in response to a determination by the comparator 214 that the output Vccpump of the switch regulator 200 has increased above the reference voltage Vref[1]. Similarly, the example method 400 can include disabling the pass element 212 in response to a determination by the comparator 208 that the output Vccpump of the switch regulator 200 has increased above the reference voltage Vref[0].

As described earlier herein, the example method 400 can include controlling any number of pass elements based on any number of reference signals. Furthermore, as also described earlier herein the pass elements 212, 216, 220, etc. can have different or the same drive strengths to allow the switch regulator 200 to enable at least one of the first pass element and the second pass element to establish a linear relationship, or any other type of relationship such as a logarithmic relationship, exponential relationship, any-order polynomial relationship, etc. as described earlier herein, between output load current and output voltage drop of the switch regulator 200.

Figure 5:
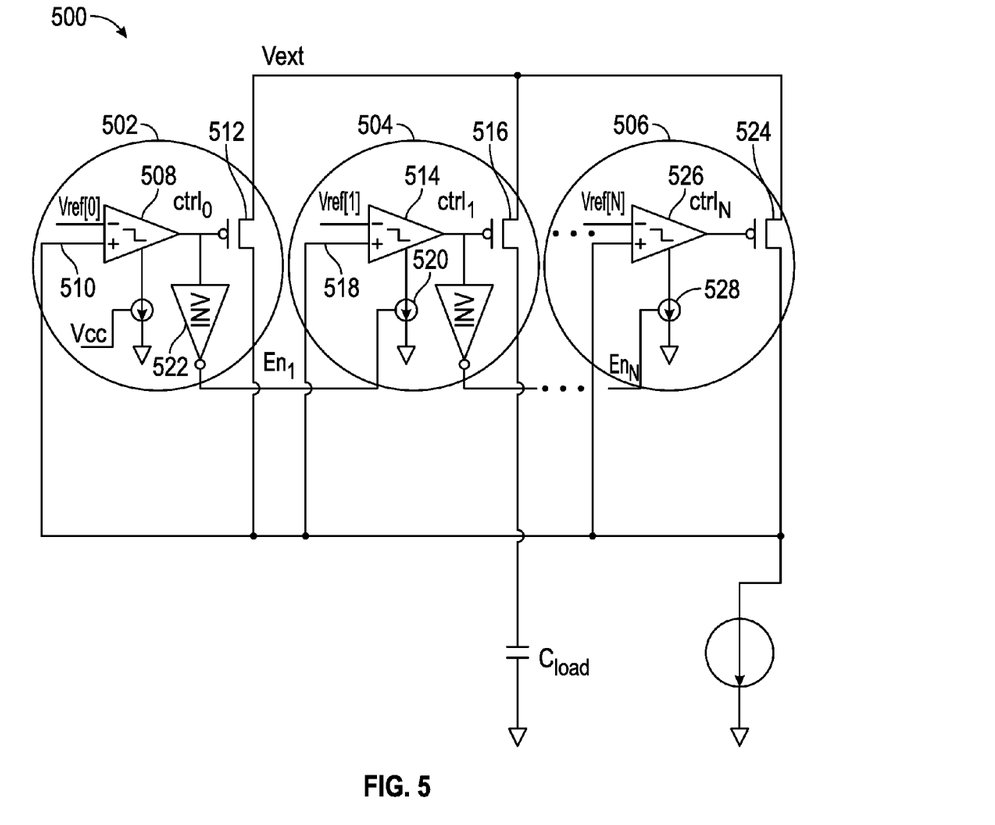
FIG. 5 shows a partial schematic diagram a ladder-based high speed switch regulator in accordance with a second embodiment.

Some embodiments provide a control scheme to further reduce power consumption by turning off some comparators in at least some operational scenarios. FIG. 5 is a partial schematic diagram a ladder-based high speed switch regulator 500 in accordance with embodiments for disabling turn off some comparators for power-saving.

Similarly to the ladder-based high speed switch regulator 200 described above with reference to FIG. 2-4, the ladder-based high speed switch regulator 500 includes a number of stages (e.g., "circuits") 502, 504, and 506. While three circuits 502, 504 and 506 are shown in FIG. 5, embodiments are not limited thereto and the ladder-based high speed switch regulator 500 can include any number of circuits. Each circuit 502, 504 and 506 includes a comparator and pass element similarly to circuits 202, 204 and 206 (FIG. 2), to introduce additional current drivability if the detected output level of the switch regulator 500 drops below a reference value corresponding to each circuit 502, 504, and 506. This additional current drivability can increase with respect to the output voltage change linearly, logarithmically, or according to any other function. If the detected output level of the switch regulator 500 rises above a reference value, the comparator of the circuit 502, 504, 506 corresponding to that reference value will turn off the corresponding pass element. Additionally, the switch regulator 500 includes tail current controls to enable or disable comparators in some operating conditions as described later herein.

A circuit 502 includes a comparator 508. The comparator 508 includes a reference input for receiving a reference voltage Vref [0], a feedback input 510 coupled to an output Vccpump of the switch regulator 500, and a comparator output $ctrl_0$. The circuit 502 further includes a pass element 512 including a control connection connected to the comparator output $ctrl_0$ and a connection to the output Vccpump of the switch regulator 500.

The circuit 504 includes a comparator 514 with a reference input for receiving a reference voltage Vref [1] lower than the reference voltage Vref [0]. The comparator 514 further includes a feedback input 518 coupled to the output Vccpump of the switch regulator 500, and a comparator output $ctrl_1$. The circuit 504 further includes a pass element 516 with a control connection connected to the comparator output $ctrl_1$ and a connection to the output Vccpump of the switch regulator 500. The circuit 504 can include a biasing tail circuit 520 coupled to the comparator output $ctrl_0$ and to the comparator 514 to receive a comparator enablement signal $En_1$ to enable or disable the comparator 514 based on the comparator output $ctrl_0$. An inverter 522 can be coupled between the biasing tail circuit 520 and the comparator output $ctrl_0$ although embodiments are not limited to including an inverter 522 and other logic can be used to enable or disable the biasing tail circuit 520.

As described earlier herein, any number of circuits similar to the circuit 502 and the circuit 504 can be included in the switch regulator 500. The pass element 512 can have the same or different drive strength as the pass element 516. Each pass element in the switch regulator can have different drive strengths. The pass element 512, and any other pass element in the switch regulator 500, can include a PMOS transistor, although embodiments are not limited thereto. In other embodiments, the pass element 512, or any other pass element, can include an NMOS transistor. Any of the comparators 508, 514, etc. can include a differential comparator, although embodiments are not limited thereto. The inputs to the comparators 508, 514, etc., are based upon a feedback ratio (either resistive or capacitive) of regulated voltage.

Figure 6:
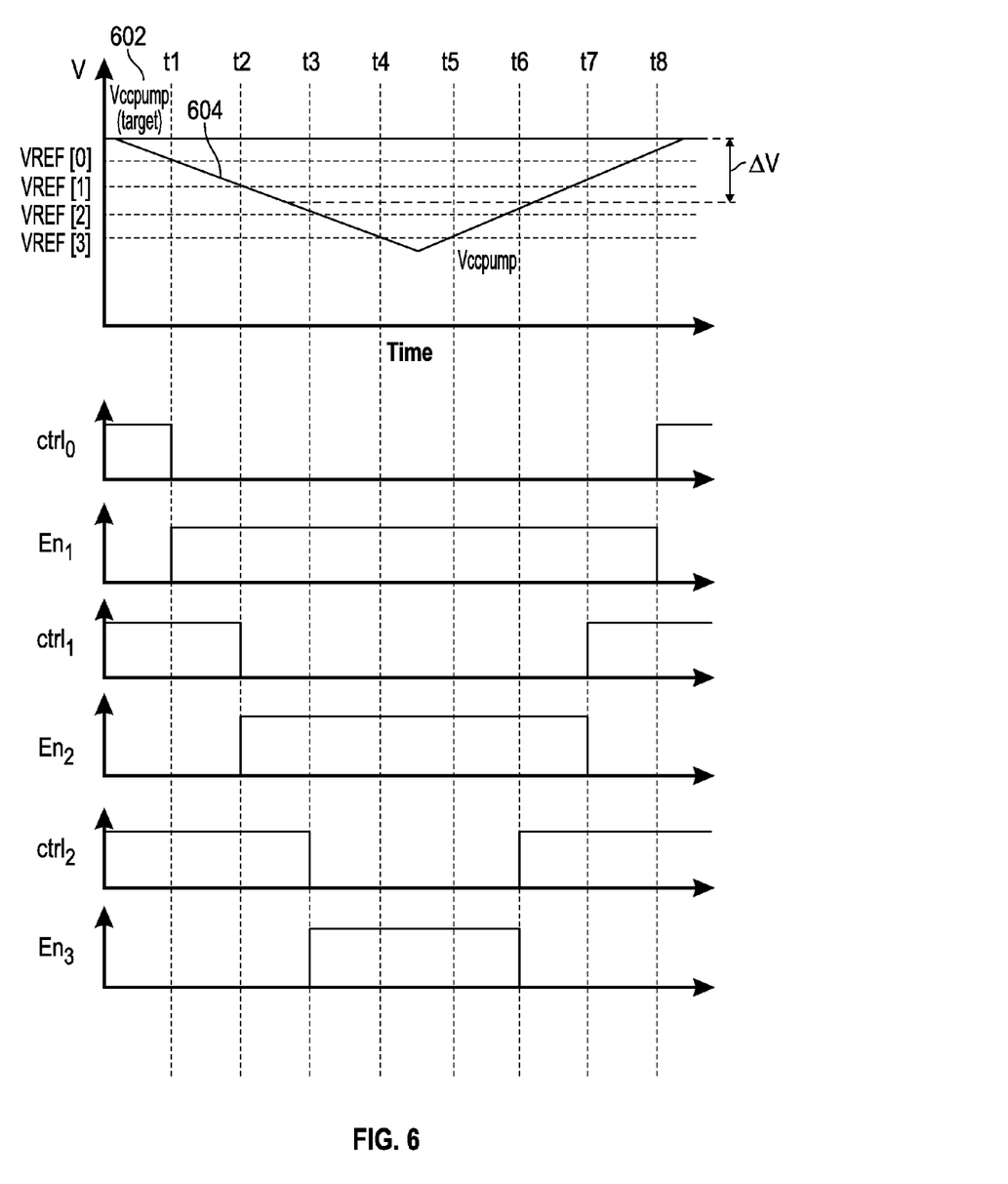
FIG. 6 shows a diagram illustrating control signals as a function of switch regulator output during operation of a switch regulator of FIG. 5 in accordance with some embodiments.

FIG. 6 illustrates control signals as a function of switch regulator output during operation of a switch regulator 500 (FIG. 5) in accordance with some embodiments. While three control signals $ctrl_0$, $ctrl_1$, and $ctrl_2$ are shown, and three comparator enablement signals $En_1$, $En_2$ and $En_3$ are shown, any number of control signals and comparator enablement signals may be possible depending on the number of circuits (e.g., stages) in the ladder-based switch regulator 500. The switch regulator 500 will turn on (e.g., "enable") one or more of pass elements 512, 516, 524 in order to maintain a target 602 output Vccpump.

Similarly to the embodiment described above with reference to FIG. 3, when the output Vccpump of the switch regulator 500 falls below the reference voltage Vref [0] at t1, the comparator output $ctrl_0$ is active low to enable the pass element 512. When the output Vccpump of the switch regulator 500 falls below the reference voltage Vref [1] at t2, the comparator output $ctrl_0$ and the comparator output $ctrl_1$ are both active low to enable the pass element 512 and the pass element 516. Conversely, as the output Vccpump of the switch regulator 500 rises above various reference voltages in time intervals t5, t6, t7, and t8, corresponding pass elements are turned off (e.g., "disabled") when corresponding comparator outputs become high.

It will be appreciated upon examination of FIG. 5-6 that any number of reference voltages, comparators, and pass elements can be included in the switch regulator 500 to control the output of the switch regulator to maintain the switch regulator 500 output at the target 602. In some embodiments, the switch regulator 500 may maintain the output within a range, such as a 10% range, 5% range, etc., of the target 602. Furthermore, the pass elements 512, 516, 524, and other pass elements (not shown in FIG. 5) can have different drive strengths. Accordingly, the switch regulator 500 can establish a linear relationship, or any other type of relationship such as a logarithmic relationship, exponential relationship, any-order polynomial relationship, etc. as described earlier herein, between output load current and output voltage drop of the switch regulator 500.

Switch regulator 500 can provide further power savings by disabling some comparators based on loading conditions. For example, if the load on the switch regulator 500 is such that Vccpump is between the reference voltage Vref [0] and the reference voltage Vref [1], then $En_1$ may be used to enable the comparator 514 (e.g., by setting $En_1$ to a logical high, or "1" value) and $En_2$ and $En_3$ (not shown in FIG. 5) may be used to disable other comparators, for example, comparator 526 or other comparators between the comparator 514 and the comparator 526 (not shown in FIG. 5), because those comparators would not be used to sense the point at which Vccpump is above Vref[1]. In at least this example scenario, the comparator 508 would remain in an enabled state, as long as Vccpump is below Vref[0], in order to provide comparator output $ctrl_0$ as active low to enable the pass element 512 to continue to provide current to increase or attempt to increase Vccpump to the target level 602. However, power savings may still be realized at comparator 508 through a reduction in DC current bias brought about by maintaining the comparator 508 in an enabled state, thereby preventing toggling of the comparator 508. If the comparator 508 were not maintained in an enabled state, the comparator 508 might toggle between an enabled and a disabled state, causing the comparator 508 to burn additional switching power when Vccpump is within a range of Vref [0]. However, because the switch regulator 500 maintains the comparator 508 in an enabled state in some embodiments, the comparator 508 may no longer burn switching power after the reference voltage drops below Vref [1], or below a percentage range of Vref [0], because the comparator 508 will be in a fully-enabled state without toggling.

Figure 7:
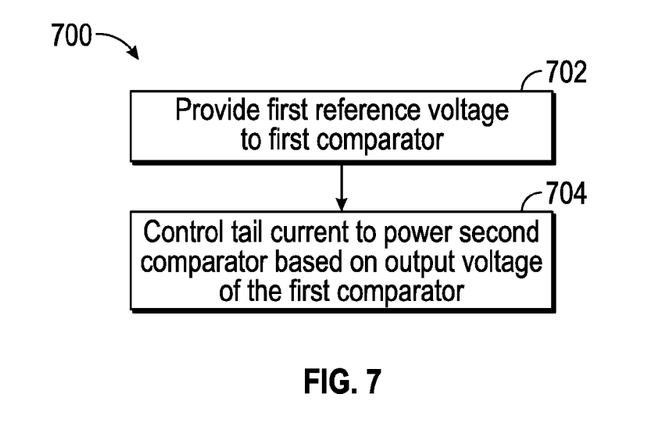
FIG. 7 is a flow diagram showing a method according to some embodiments.

FIG. 7 is a flow diagram showing an example method 700 of operating a ladder-based high speed switch regulator 500 of FIG. 5 in accordance with some embodiments.

The example method 700 begins at operation 702 with providing a reference voltage Vref [0] and output Vccpump of the switch regulator 500 to a comparator 508 of the switch regulator 500 to generate a comparator output $ctrl_0$.

The example method 700 continues at operation 704 with controlling a biasing tail circuit 520 to provide power to a comparator 514 of the switch regulator 500 if the comparator output $ctrl_0$ indicates that the output Vccpump of the switch regulator 500 is less than reference voltage Vref [0], and controlling the biasing tail circuit 520 to maintain the comparator 514 in a disabled state otherwise.

The example method 700 can include enabling a pass element 512 of the switch regulator 500 if the comparator output $ctrl_0$ indicates that the output Vccpump of the switch regulator 500 is less than reference voltage Vref [0]. The method 700 can further include providing a reference voltage Vref[1], lower than the reference voltage Vref [0], to the comparator 514 of the switch regulator 500 to generate a comparator output, $ctrl_1$. The method 700 can include controlling a tail current 528 to provide power to a comparator 526 of the switch regulator 500 if the comparator output, $ctrl_{N-1}$ (not shown in FIG. 5) of a previous stage of the switch regulator 500 indicates that the output Vccpump of the switch regulator 500 is less than a reference voltage Vref [N−1] corresponding to the previous stage of the switch regulator 500 (not shown in FIG. 5), and controlling the tail current 628 to maintain the comparator element 626 in a disabled state otherwise.

As described earlier herein, the example method 700 can include controlling any number of pass elements based on any number of reference signals. The example method 700 can include controlling any number of tail currents to enable or disable corresponding comparators for additional power savings. Furthermore, as also described earlier herein with reference to FIG. 2-4, the pass elements 512, 516, 524, etc. can have different or the same drive strengths to allow the switch regulator 500 to increase with respect to the output load current linearly, logarithmically, or according to any other function.

Figure 8:
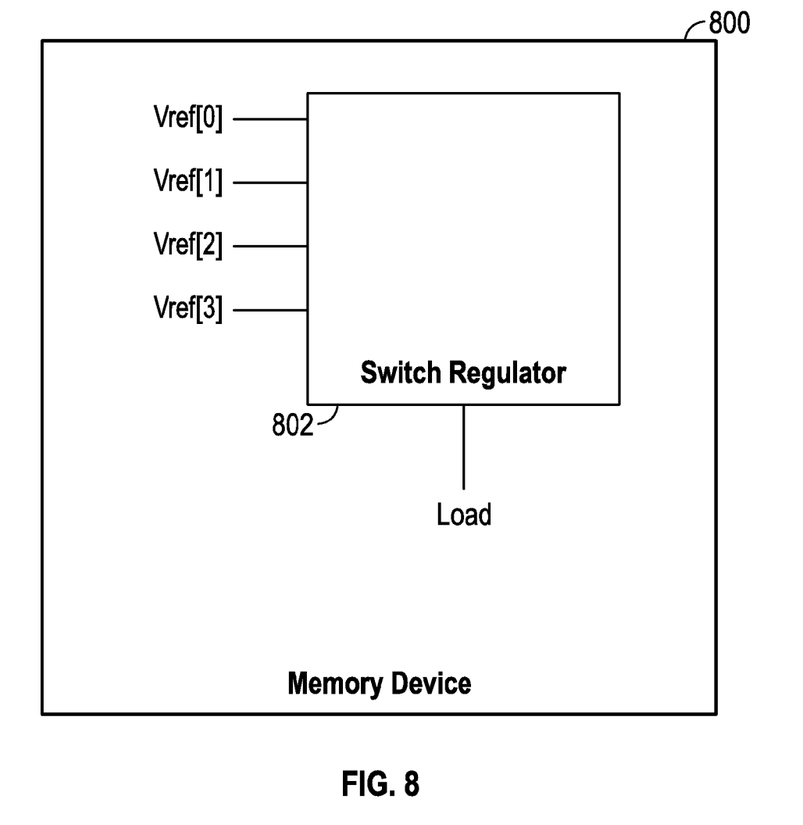
FIG. 8 is a block diagram of a memory device including a ladder-based high speed switch regulator of some embodiments.

FIG. 8 is a block diagram of a memory device 800 including a ladder-based switch regulator 802. The ladder-based switch regulator 802 can be the same or similar as the ladder-based switch regulator 200 or 500 as described earlier herein with reference to FIGS. 2 and 5, respectively, although embodiments are not limited thereto. For example, the ladder-based switch regulator 802 will have reference voltage inputs Vref[0], Vref[1], Vref[2], etc., an input voltage Vcc, and a load. The ladder-based switch regulator 802 will maintain a constant output voltage at the load using circuitry and methods as described herein with reference to FIGS. 2-7.

The apparatuses (e.g., ladder-based switch regulators 200 and 500) described above can include or be included in high-speed computers, communication and signal processing circuitry, single or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A switch regulator comprising:
  a first circuit, including
    a first comparator including a first reference input for receiving a first reference voltage, a first feedback input coupled to an output of the switch regulator, and a first comparator output, and
    a first pass element including a first control connection connected to the first comparator output and with a second connection connected to the output of the switch regulator; and
  a second circuit, including a second comparator with a second reference input for receiving a second reference voltage lower than the first reference voltage, a second feedback input coupled to the output of the switch regulator, and a second comparator output, and a second pass element with a second control connection connected to the second comparator output and a third connection connected to the output of the switch regulator.

2. The switch regulator of claim 1, wherein the first pass element has a different drive strength than the second pass element.

3. The switch regulator of claim 2, wherein the second pass element has a higher drive strength than the first pass element.

4. The switch regulator of claim 1, wherein the first pass element has the same strength as the second pass element.

5. The switch regulator of claim 1, wherein the first pass element includes a p-channel metal-oxide-semiconductor (PMOS) transistor.

6. The switch regulator of claim 1, wherein the first pass element includes an n-channel metal-oxide-semiconductor (NMOS) transistor.

7. The switch regulator of claim 1, wherein the first comparator and the second comparator each include a differential comparator.

8. A method comprising:
providing a first reference voltage and an output of a switch regulator to a first comparator element of the switch regulator to generate a first comparator output;
enabling a first pass element of the switch regulator if the first comparator output indicates that the output of the switch regulator is less than the first reference voltage;
providing a second reference voltage, lower than the first reference voltage, to a second comparator element of the switch regulator to generate a second comparator output; and
enabling a second pass element of the switch regulator, and maintaining enablement of the first pass element of the switch regulator, if the second comparator output indicates that the output of the switch regulator is less than the second reference voltage, and maintaining the second pass element of the switch regulator in a disabled stated otherwise.

9. The method of claim 8, further comprising:
disabling the second pass element in response to a determination that the output of the switch regulator has increased above the second reference voltage.

10. The method of claim 9, further comprising:
disabling the first pass element in response to a determination that the output of the switch regulator has increased above the first reference voltage.

11. The method of claim 8, wherein the first pass element has a same drive strength as the second pass element, and wherein the method further includes enabling at least one of the first pass element and the second pass element to establish a linear relationship between output load current and output voltage drop of the switch regulator.

12. The method of claim 8, wherein the first pass element has a lower drive strength than the second pass element, and wherein the method includes enabling at least one of the first pass element and the second pass element to establish a logarithmic relationship between output load current and output voltage drop of the switch regulator.

13. A switch regulator comprising:
a first circuit, including a first comparator including a first reference input for receiving a reference voltage, a first feedback input coupled to an output of the switch regulator, and a first comparator output, and a first pass element with a first control connection connected to the first comparator output and with a second connection connected to the output of the switch regulator; and a second circuit, including
a second comparator with a second reference input for receiving a second reference voltage, a second feedback input coupled to the output of the switch regulator, and a second comparator output,
a biasing tail circuit coupled to the first comparator output and to the second comparator to disable the second comparator based on the first comparator output, and
a second pass element with a second control connection connected to the second comparator output and a third connection connected to the output of the switch regulator.

14. The switch regulator of claim 13, further including an inverter coupled between the first comparator output and the biasing tail circuit of the second circuit.

15. The switch regulator of claim 13, wherein the first pass element has a different drive strength than the second pass element.

16. The switch regulator of claim 15, wherein the second pass element has a higher drive strength than the first pass element.

17. A method comprising:
providing a first reference voltage and an output of a switch regulator to a first comparator element of the switch regulator to generate a first comparator output;
controlling a tail current to provide power to a second comparator element of the switch regulator if the first comparator output indicates that the output of the switch regulator is less than the first reference voltage, and controlling the tail current to maintain the second comparator element in a disabled state otherwise; and
if the first comparator output indicates that the output of the switch regulator is less than the first reference voltage:
enabling a first pass element of the switch regulator;
providing a second reference voltage, lower than the first reference voltage, to the second comparator element of the switch regulator to generate a second comparator output; and
controlling a tail current to provide power to a third comparator element of the switch regulator if the second comparator output indicates that the output of the switch regulator is less than the second reference voltage, and controlling the tail current to maintain the third comparator element in a disabled state otherwise.

18. The method of claim 17, further comprising:
enabling a second pass element if the second comparator output indicates that the output of the switch regulator is less than the second reference voltage, and maintaining the second pass element in a disabled state otherwise.

19. The method of claim 18, further comprising:
maintaining the first comparator element and the first pass element in an enabled state when the second comparator output indicates that the output of the switch regulator is less than the second reference voltage.

* * * * *